(12) United States Patent
Bennison et al.

(10) Patent No.: US 7,919,175 B2
(45) Date of Patent: *Apr. 5, 2011

(54) TRANSPARENT LIGHT-WEIGHT SAFETY GLAZINGS

(75) Inventors: Stephen J. Bennison, Wilmington, DE (US); David F. Kristunas, Townsend, DE (US); Andres Ovalle, Bogota (CO)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/618,036

(22) Filed: Nov. 13, 2009

(65) Prior Publication Data

US 2010/0062236 A1 Mar. 11, 2010

(51) Int. Cl.
*B32B 7/02* (2006.01)
*B32B 17/10* (2006.01)

(52) U.S. Cl. ........ 428/215; 428/332; 428/437; 428/441; 428/442

(58) Field of Classification Search .................. 428/215, 428/332, 437, 441, 442
See application file for complete search history.

(56) References Cited

U.S. PATENT DOCUMENTS

| | | |
|---|---|---|
| 3,344,014 A | 9/1967 | Rees |
| 3,762,988 A | 10/1973 | Clock et al. |
| 4,059,469 A | 11/1977 | Mattimoe et al. |
| 4,072,779 A | 2/1978 | Knox et al. |
| 4,075,386 A | 2/1978 | Willdorf |
| 4,112,171 A | 9/1978 | Motter et al. |
| 4,242,403 A | 12/1980 | Mattimoe et al. |
| 4,328,277 A | 5/1982 | Molari, Jr. |
| 4,355,077 A | 10/1982 | Chevreux et al. |
| 4,469,743 A | 9/1984 | Hiss |
| 4,594,290 A | 6/1986 | Fischer et al. |
| 4,595,624 A | 6/1986 | Greathead |
| 4,619,973 A | 10/1986 | Smith, Jr. |
| 4,647,493 A | 3/1987 | LeGrand et al. |
| 4,663,228 A | 5/1987 | Bolton et al. |
| 4,668,574 A | 5/1987 | Bolton et al. |
| 4,747,896 A | 5/1988 | Anastasie |
| 4,774,143 A | 9/1988 | Gondela et al. |
| 4,799,346 A | 1/1989 | Bolton et al. |

(Continued)

FOREIGN PATENT DOCUMENTS

BR 04016343 A 6/2005

(Continued)

OTHER PUBLICATIONS

PCT Search Report for International Application No. PCT/US2009/045799, dated Oct. 8, 2009.

(Continued)

*Primary Examiner* — D. S Nakarani
(74) *Attorney, Agent, or Firm* — Maria M. Kourtakis; Kelly Law Registry (57) ABSTRACT

Provided is a transparent and light-weight ballistic resistant safety glazing comprising an ionomer sheet. The ionomer sheet comprises an ionomer derived from a parent acid copolymer that comprises copolymerized units of an α-olefin having 2 to 10 carbon atoms and, based on the total weight of the acid copolymer, about 20 to about 30 wt % of copolymerized units of an α,β-ethylenically unsaturated carboxylic acid having 3 to 8 carbon atoms. The ionomer is neutralized to a level of about 5% to about 90%, based on the total carboxylic acid content of the acid copolymer, and further comprises at least one cation. Further provided are articles comprising the light-weight ballistic resistant safety glazing.

24 Claims, 1 Drawing Sheet

U.S. PATENT DOCUMENTS

| | | |
|---|---|---|
| 4,812,359 A | 3/1989 | Hall |
| 4,861,666 A | 8/1989 | LeGrand et al. |
| 4,879,183 A | 11/1989 | Mannheim |
| 4,952,457 A | 8/1990 | Cartier et al. |
| 4,956,227 A | 9/1990 | Hirayama et al. |
| 5,002,820 A | 3/1991 | Bolton et al. |
| 5,019,443 A | 5/1991 | Hall |
| 5,229,204 A | 7/1993 | Labock |
| 5,318,853 A | 6/1994 | Bayha et al. |
| 5,368,904 A | 11/1994 | Stephinson |
| 5,393,365 A | 2/1995 | Smith |
| 5,415,942 A | 5/1995 | Anderson |
| 5,496,643 A | 3/1996 | Von Alpen |
| 5,501,910 A | 3/1996 | Smith |
| 5,506,051 A | 4/1996 | Levy-Borochov et al. |
| 5,560,149 A | 10/1996 | Lafevre |
| 5,567,529 A | 10/1996 | Smith |
| 5,631,089 A | 5/1997 | Center, Jr. et al. |
| 5,645,940 A | 7/1997 | Teddington, Jr. et al. |
| 5,698,053 A | 12/1997 | Carroll et al. |
| 5,707,695 A | 1/1998 | Ramanujam |
| 5,747,170 A | 5/1998 | Von Alpen et al. |
| 5,759,698 A | 6/1998 | Tanuma et al. |
| 5,763,062 A | 6/1998 | Smith et al. |
| 5,858,483 A | 1/1999 | Ramanujam |
| 5,895,721 A | 4/1999 | Naoumenko et al. |
| 5,906,411 A | 5/1999 | Stauffer et al. |
| 5,908,674 A | 6/1999 | Schindler et al. |
| 6,108,999 A | 8/2000 | Smith et al. |
| 6,129,974 A | 10/2000 | Woll |
| 6,150,028 A | 11/2000 | Mazon |
| 6,265,054 B1 | 7/2001 | Bravet et al. |
| 6,276,750 B1 | 8/2001 | Frisch |
| 6,280,826 B1 | 8/2001 | Woll et al. |
| 6,334,382 B2 | 1/2002 | Gourio |
| 6,432,522 B1 | 8/2002 | Friedman et al. |
| 6,569,787 B1 | 5/2003 | Snelling |
| 6,630,235 B2 | 10/2003 | Oshima et al. |
| 6,675,550 B1 | 1/2004 | Dlubak |
| 6,818,268 B2 | 11/2004 | Gonzalez |
| 7,191,694 B1 | 3/2007 | Gonzalez |
| 7,294,401 B2 | 11/2007 | Anderson et al. |
| 2001/0032540 A1 | 10/2001 | Gourio |
| 2002/0155302 A1 | 10/2002 | Smith et al. |
| 2002/0160198 A1 | 10/2002 | Oshima et al. |
| 2004/0111986 A1 | 6/2004 | Zurhaar |
| 2005/0238880 A1 | 10/2005 | Labock |
| 2006/0182983 A1 | 8/2006 | Paul et al. |
| 2007/0092706 A1 | 4/2007 | Pesek et al. |
| 2007/0122633 A1 | 5/2007 | Pesek et al. |
| 2007/0289693 A1 | 12/2007 | Anderson et al. |
| 2008/0044666 A1 | 2/2008 | Anderson et al. |

FOREIGN PATENT DOCUMENTS

| | | |
|---|---|---|
| CA | 2388107 A1 | 5/2002 |
| EP | 1182710 A1 | 2/2002 |
| EP | 1759832 A1 | 3/2007 |
| WO | 91/01880 | 2/1991 |
| WO | 99/58334 | 11/1999 |
| WO | 01/60604 A1 | 8/2001 |
| WO | 03057478 A1 | 7/2003 |
| WO | 03068501 A1 | 8/2003 |
| WO | 2006057771 A2 | 6/2006 |
| WO | 2007/079091 A1 | 7/2007 |
| WO | 2007149082 A1 | 12/2007 |

OTHER PUBLICATIONS

PCT Written Opinion for International Application No. PCT/US2009/045799, dated Oct. 8, 2009.

TRANSPARENT LIGHT-WEIGHT SAFETY GLAZINGS

CROSS-REFERENCE TO RELATED APPLICATION

This application claims the benefit of U.S. application Ser. No. 12/215,839, filed Jun. 30, 2008, now U.S. Pat. No. 7,641,965, the entire disclosure of which is incorporated herein by reference.

FIELD OF THE INVENTION

The invention relates to the field of impact and penetration resistant glazing. In particular, provided herein is transparent and light-weight safety glazing that has resistance to ballistic impacts and that comprises ionomer sheets.

BACKGROUND OF THE INVENTION

Several patents, patent applications and publications are cited in this description in order to more fully describe the state of the art to which this invention pertains. The entire disclosure of each of these patents, patent applications and publications is incorporated by reference herein.

Laminated safety glazing has been in use for almost a century. It has been used in a variety of industries, such as the architecture and transportation industries. For example, laminated safety glazing that possesses high impact and penetration resistance and that does not scatter glass shards or debris when it is shattered can be used as windows in buildings and as windshields or moon roofs in automobiles.

Laminated safety glazing is typically formed by bonding two glass sheets together with a polymeric interlayer sheet. In some cases, one or both of the glass sheets may be replaced with optically clear rigid polymeric sheets, such as polycarbonate sheets.

The polymer interlayer sheets used in safety glazing are typically made from relatively thick polymer sheets that have adequate toughness and are bonded to the glass sheets. Thus, in the event of a crack or crash, objects do not penetrate the safety glazing and glass shards adhere to the interlayer. Widely used interlayer materials include poly(vinyl acetal) (e.g., poly(vinyl butyral) (PVB)), poly(urethane) (PU), poly(ethylene vinyl acetate) (EVA) and ethylene acid copolymers.

Ionomers of ethylene acid copolymers have also been used as interlayer sheets in safety glazing. See, e.g., U.S. Pat. Nos. 3,344,014; 3,762,988; 4,663,228; 4,668,574; 4,799,346; 5,759,698; 5,763,062; 5,895,721; 6,150,028; 6,265,054; and 6,432,522; U.S. Patent Publication Nos. 20020155302; 20020155302; 20060182983; 20070092706; 20070122633; 20070289693; 20080044666; and PCT Patent Publication Nos. WO9958334; WO2006057771; and WO2007149082.

Because of a generally increasing desire for protection from crime, safety glazing with ballistic resistance is now in higher demand. Such ballistic resistant safety glazing generally comprises two distinct zones, an impact zone and an anti-spall zone. The impact zone is the part that is closer to the impact force. It is designed to possess high impact resistance and is often formed of multiple layers or plies of glass interspaced by polymer sheets. The anti-spall zone is the part that is farther away from the impact force. It is designed to prevent splinters from detaching upon impact and is often formed of a glass or film layer. In some structures, the anti-spall zone may further include an energy absorbing polymer sheet layer which may also provide additional bonding force between the impact and anti-spall zones. Safety glazing with ballistic resistance can be used as armors for civilian cars, military vehicles, cash trucks, armored cars, and the like. In addition, they may also be used on buildings, high speed trains, aircraft, construction equipment, farm equipment, and the like. See, e.g., U.S. Pat. Nos. 5,906,411 and 6,276,750.

Various transparent safety glazings with ballistic resistance have been described in, for example, U.S. Pat. Nos. 2,991,209; 3,624,238; 3,657,057; 3,671,370; 3,917,891; 3,930,452; 4,125,669; 4,130,684; 4,204,026; 4,322,476; 4,328,277; 4,355,077; 4,594,290; 4,595,624; 4,647,493; 4,747,896; 4,774,143; 4,812,359; 4,861,666; 4,879,183; 5,019,443; 5,229,204; 5,318,853; 5,496,643; 5,506,051; 5,747,170; 6,108,999; 6,129,974; 6,280,826; 6,327,954; 6,334,382; 6,569,787; 6,818,268; and 7,191,694 and US Patent Publication Nos. 20010032540 and 20050238880.

In particular, U.S. Pat. No. 5,002,820 describes an anti-spalling safety glazing including a front lamina formed of polycarbonate or glass sheet(s) and a back lamina formed of an ionomer sheet and a 0.3 to 1.8 mm thick glass sheet. In addition, PCT Patent Publication No. WO03068501 describes a bullet-resistant glazing including an impact zone formed of multiple plies of glass sheets interspaced by PVB sheets and an anti-spall zone formed of an ionomer sheet and a chemically strengthened thin glass sheet.

Examples of descriptions of the use of plastic films in ballistic resistant safety glazing include, e.g., U.S. Pat. Nos. 4,072,779; 4,075,386; 4,112,171; 4,242,403; 4,469,743; 4,952,457; 4,956,227; 5,368,904; 5,393,365; 5,415,942; 5,501,910; 5,560,149; 5,567,529; 5,631,089; 5,645,940; 5,698,053; 5,707,695; 5,858,483; 5,908,674; 6,630,235; and 7,294,401 and U.S. Patent Publication No. 20040111986). In particular, U.S. Pat. No. 5,567,529 describes an anti-bullet glazing comprising an anti-spall zone formed of a composite of a PVB sheet and a poly(ethylene terephthalate) (PET) film. U.S. Patent Publication No. 20020160198 describes bulletproof glass screen comprising a fracture-proof plastic film (i.e., a polyethylene, polyester, poly(vinyl chloride), or polycarbonate film) as the innermost surface that faces to the protected object.

One way to improve ballistic resistance of a safety glazing is to increase the number of laminate layers or the thickness of the laminate layers, especially in the impact zone. Consequently, as the total thickness of the glazing increases, the total weight of the glazing goes up and the transparency of the glazing goes down. These effects are plainly undesirable. Accordingly, there remains a need for thin or light-weight transparent safety glazing with ballistic resistance.

SUMMARY OF THE INVENTION

Provided herein is a ballistic resistant safety glazing comprising an impact zone and, adhered firmly to the impact zone, an anti-spall zone. A preferred anti-spall zone comprises a polymer sheet having a first surface that is adhered firmly to the impact zone and a second surface that is adhered firmly to a polymer film. The impact zone comprises n glass sheets and at least (n−1) ionomer sheets, where n is an integer and $2 \leq n \leq 10$. Each adjacent pair of glass sheets is interspaced by at least ionomer sheet, and the glass sheets and the ionomer sheets are adhered firmly to each other. Each of the ionomer sheets comprises an ionomer composition that comprises an ionomer. The ionomer is derived from a parent acid copolymer that comprises copolymerized units of an α-olefin having from 2 to 10 carbon atoms and, based on the total weight of the parent acid copolymer, from about 20 to about 30 wt % of copolymerized units of an α,β-ethylenically unsaturated carboxylic acid having 3 to 8 carbon atoms. The ionomer is neutralized to a level of about 5 mole % to about 90 mole % of carboxylate groups, based on the total number of moles of copolymerized units of α,β-ethylenically unsaturated carboxylic acid in the parent acid copolymer. The ionomer further comprises cations as counterions to the carboxylate groups. The ionomers and the ionomer compositions of the ionomer sheets may be the same or different.

Further provided is an article comprising this safety glazing.

The advantages and features of novelty that characterize the invention are pointed out with particularity in the claims annexed hereto and forming a part hereof. For a better understanding of the invention, its advantages, and the objects obtained by its use, however, reference should be made to the drawings which form a further part hereof, and to the accompanying descriptive matter, in which there is illustrated and described one or more preferred embodiments of the invention.

DETAILED DESCRIPTION OF THE INVENTION

The following definitions apply to the terms as used throughout this specification, unless otherwise limited in specific instances.

Moreover, unless otherwise defined, all technical and scientific terms used herein have the same meaning as commonly understood by one of ordinary skill in the art to which this invention belongs. In case of conflict, the present specification, including the definitions herein, will control.

Although methods and materials similar or equivalent to those described herein can be used in the practice or testing of the invention, suitable methods and materials are described herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

In addition, the ranges set forth herein include their endpoints unless expressly stated otherwise in limited circumstances. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

Moreover, where a range of numerical values is recited herein, unless otherwise stated in specific circumstances, the range is intended to include the endpoints thereof, and all integers and fractions within the range. It is not intended that the scope of the invention be limited to the specific values recited when defining a range. Finally, when the term "about" is used in describing a value or an end-point of a range, the disclosure should be understood to include the specific value or end-point referred to.

When materials, methods, or machinery are described herein with the term "known to those of skill in the art", or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

As used herein, the terms "comprises," "comprising," "includes," "including," "containing," "characterized by," "has," "having" or any other synonym or variation thereof refer to a non-exclusive inclusion. For example, a process, method, article, or apparatus that is described as comprising a particular list of elements is not necessarily limited to those particularly listed elements but may further include other elements not expressly listed or inherent to such process, method, article, or apparatus.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format."

Where an invention or a portion thereof is described with an open-ended term such as "comprising," it is to be understood that, unless otherwise stated in specific circumstances, this description also includes a description of the invention using the term "consisting essentially of" as they are defined above.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

As used herein, the term "copolymer" refers to polymers comprising copolymerized units or residues resulting from copolymerization of two or more comonomers. In this connection, a copolymer may be described herein with reference to its constituent comonomers or to the amounts of its constituent comonomers, for example "a copolymer comprising ethylene and 9 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "acid copolymer" refers to a polymer comprising copolymerized units of an α-olefin, an α,β-ethylenically unsaturated carboxylic acid, and optionally other suitable comonomer(s), such as an α,β-ethylenically unsaturated carboxylic acid ester.

The term "ionomer" refers to a polymer that is produced by partially or fully neutralizing an acid copolymer as described above.

The term "laminate", as used herein alone or in combined form, such as "laminated" or "lamination" for example, refers to a structure having at least two layers that are adhered or bonded firmly to each other. The layers may be adhered to each other directly or indirectly. "Directly" means that there is no additional material, such as an interlayer or an adhesive layer, between the two layers, and "indirectly" means that there is additional material between the two layers.

The term "areal density" refers to the weight of a laminate divided by its projected surface area. For example, in a laminate that has the shape of a rectangular prism, the projected surface area is the product of the length and width of the laminate, and does not include the surface areas of the laminate's sides and bottom.

The materials, methods, and examples herein are illustrative only and, except as specifically stated, are not intended to be limiting.

Finally, all percentages, parts, ratios, and the like set forth herein are by weight, unless otherwise stated in specific instances.

Figure 1:
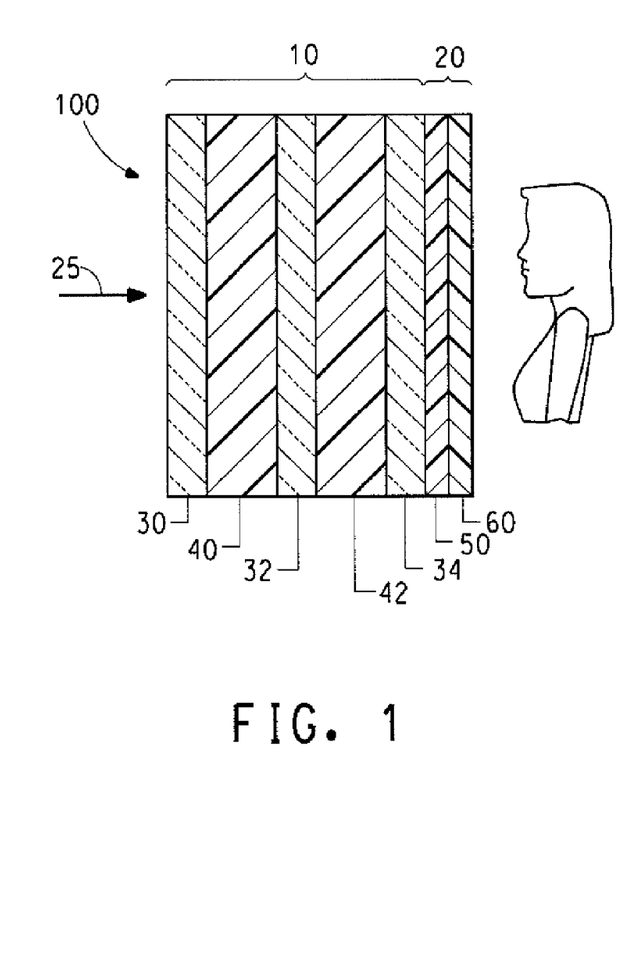
FIG. 1 is a cross-sectional view of a first ballistic resistant safety glazing.

Referring now to the drawings, wherein like reference numerals designate corresponding structure throughout the views, and referring in particular to FIG. 1, a ballistic resistant laminated safety glazing 100 is depicted. The safety glazing 100 includes an impact zone 10 and an anti-spall zone 20. More specifically, the impact zone 10 is closer to the impact force, which is represented by arrow 25, and further away from the person intended to be protected, who is shown in profile, Conversely, the anti-spall zone 20 is farther away from the impact force 25 and closer to the person intended to be protected. Stated alternatively, the impact zone 10 is proximal to the impact force 25 and distal to the person, and the anti-spall zone 20 is proximal to the person and distal to the impact force 25. In this connection, as used herein, unless expressly limited in specific circumstances, the term "person", as in "person intended to be protected", e.g., also refers to an animal or an object, for example an artifact in a display case, such as a museum exhibit.

Still referring to FIG. 1, the impact zone 10 of safety glazing 100 comprises two or more polymeric interlayers 40 and 42 interspaced between at least three rigid sheets 30, 32 and 34. The polymeric interlayers 40 and 42 are adjoining, more preferably adjacent and still more preferably contiguous with the rigid sheets 30, 32 and 34.

In addition, the safety glazing 100 should possess the degree of mechanical integrity that is necessary to promote the functions of preventing the impact force 25 from penetrating the glazing 100 and of preventing splinters from detaching from the glazing 100 upon impact. Accordingly, it is preferred that the layers 30, 32, 34, 40, 42 and any others that may be present be firmly adhered to each other. As is discussed in detail below, lamination, with or without the aid of adhesives and primers, is one suitable process for attaining the desired adhesion.

The polymeric interlayers 40 and 42 may comprise a polycarbonate or a poly(vinyl acetal), such as poly(vinyl butyral), for example. When one or both of the polymeric interlayers 40 or 42 comprises polycarbonate, and when two or more of the rigid sheets 30, 32 and 34 are glass sheets, safety glazing 100 is of the type generally known as "glass-clad polycarbonate". Also, an adhesive or primer, such as those described below with respect to the anti-spall zone 20, is preferably used to adhere the polycarbonate firmly to the rigid sheets 30, 32 and 34. Examples of suitable polycarbonates are described in U.S. Pat. No. 4,103,070, for example. Examples of suitable poly(vinyl butyral)s are described in U.S. Patent Appln. Publn. No. 2007-0172636, for example. Some suitable poly(vinyl butyral)s are commercially available from E.I. du Pont de Nemours & Co. of Wilmington, Del. ("DuPont") under the Butacite® trademark.

The rigid sheets 30, 32 and 34 may be the same or different, and they may comprise polycarbonates, acrylics, polyacrylates, cyclic polyolefins, metallocene-catalyzed polystyrene and mixtures or combinations of two or more thereof. Preferably, however, the rigid sheets 30, 32 and 34 comprise glass. The term "glass" includes any type of glass. Suitable types of glass include, but are not limited to, window glass, plate glass, silicate glass, sheet glass, low iron glass, tempered glass, tempered CeO-free glass, float glass, borosilicate glass, low density glass, annealed glass, heat strengthened glass, silica glass, chemically strengthened glass, colored glass, specialty glass (e.g., glass with functional additives(s), such as those controlling solar heating), coated glass (e.g., glass that are coated with sputtered metals, such as silver or indium tin oxide), E-glass, Toroglass, and Solex® glass (Solutia, Inc., St. Louis, Mo.). For example, U.S. Pat. Nos. 4,615,989; 5,173,212; 5,264,286; 6,150,028; 6,340,646; 6,461,736; and 6,468,934 describe specialty glass, and U.S. Patent Publication No. 20070060465 and PCT Patent Publication No. WO03068501 describe chemically strengthened glass. The type of glass to be used in any particular configuration of the laminated safety glazing 100 is determined based on the intended use. In a preferred configuration, the glass sheets 30, 32 and 34 are made of low density glass, such as borosilicate glass.

Still referring to FIG. 1, the anti-spall zone 20 comprises a layer of adhesive 50 and a layer of abrasion-resistant polycarbonate 60. Suitable adhesives include polyurethanes and alkyds. Suitable polycarbonates are as described above with respect to polymeric interlayers 40 and 42. Abrasion resistant coatings suitable for polycarbonates are described in U.S. Pat. No. 6,306,502, for example. Again, U.S. Pat. No. 5,445,890, for example, describes some glass-clad polycarbonate structures and methods of fabricating them.

Glass-clad polycarbonate safety glazing 100 such as that shown in FIG. 1 can provide resistance to ballistic impacts 25; however, this type of glazing may be thick, heavy, and deficient in clarity or transparency.

Figure 2:
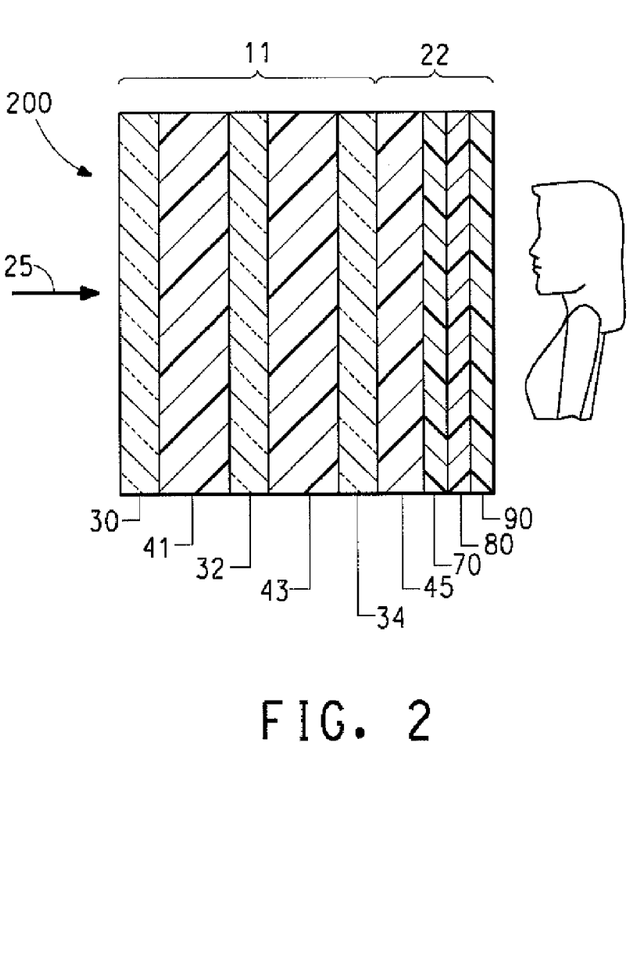
FIG. 2 is a cross-sectional view of a second ballistic resistant safety glazing.

Referring now to FIG. 2, the safety glazing 200 provided herein also provides resistance to ballistic impacts 25; however, it may be thinner, lighter, clearer, more transparent or less hazy than glass-clad polycarbonate safety glazing 100. The configuration of safety glazing 200 that is depicted in FIG. 2 comprises an impact zone 11 which, in turn, comprises three rigid sheets 30, 32 and 34 interleaved by two polymeric interlayers 41 and 43. Also shown in the configuration depicted in FIG. 2 is an anti-spall zone 22 comprising a polymeric sheet 45 and a polymer film 80. In this configuration, the polymer film 80 is coated, in whole or in part, with an adhesive or primer layer 70, and it is also coated, in whole or in part, with a hardcoat 90.

In general, the safety glazing described herein comprises an impact zone which, in turn, comprises two or more rigid sheets and one or more polymeric interlayers. Each adjacent pair of rigid sheets is interspaced by at least one polymeric interlayer. Preferably, at least one of the polymeric interlayers is an ionomer sheet. In more preferred configurations, some of which are discussed at length below, all of the polymeric interlayers are ionomer sheets.

More specifically, the impact zone may comprise two rigid sheets and one ionomer sheet, wherein the two rigid sheets are interspaced by the one ionomer sheet. Alternatively, as depicted in FIG. 2, the impact zone 11 may comprise three rigid sheets 30, 32 and 34 and two ionomer sheets 41 and 43, wherein each adjacent pair of the rigid sheets (30, 32) and (32, 34) are interspaced by one of the two ionomer sheets 41 and 43. Again alternatively, the safety glazing described herein may comprise four rigid sheets and three ionomer sheets, wherein each adjacent pair of the rigid sheets is interspaced by one of the three ionomer sheets. In summary, the impact zone may comprise n rigid sheets and (n−1) ionomer sheets, wherein n is an integer and $2 \leq n \leq 10$, and wherein each adjacent pair of rigid sheets is interspaced by one of the ionomer sheets.

Suitable and preferred rigid sheets are described in detail above with respect to the safety glazing 100 shown in FIG. 1. To summarize, the rigid sheets may be the same or different, and they are preferably glass sheets and more preferably low density glass sheets. In more preferred configurations, some of which are discussed at length below, all of the rigid sheets are glass sheets.

The thickness of each of the glass sheets is not critical. Preferably, however, each of the glass sheets used in the safety glazing described herein independently has a thickness of about 1 to about 16 mm, more preferably about 1 to about 10 mm, still more preferably about 2 to about 8 mm, or still more preferably about 2 to about 6 mm.

In a preferred configuration of the safety glazing provided herein, each of the ionomer sheets comprises an ionomer composition. In configurations with more than one ionomer sheet, each ionomer sheet has an ionomer composition that may be the same as or different from the ionomer composition(s) of the other ionomer sheet(s). The ionomer composition comprises an ionomer that is derived from a parent acid copolymer, and may include more than one ionomer. The parent acid copolymer comprises copolymerized units of an α-olefin having from 2 to 10 carbon atoms and about 20 to about 30 wt %, preferably about 20 to about 25 wt %, or more preferably about 21 to about 23 wt % of copolymerized units of an α,β-ethylenically unsaturated carboxylic acid having 3 to 8 carbon atoms. The weight percentage is based on the total weight of the parent acid copolymer.

Suitable α-olefin comonomers include, but are not limited to, ethylene, propylene, 1-butene, 1-pentene, 1-hexene, 1-heptene, 3 methyl-1-butene, 4-methy-1-pentene, and the like and mixtures of two or more thereof. Preferably, the α-olefin comprises ethylene; more prefereably, the α-olefin consists essentially of ethylene.

Suitable α,β-ethylenically unsaturated carboxylic acid comonomers include, but are not limited to, acrylic acids, methacrylic acids, itaconic acids, maleic acids, maleic anhydrides, fumaric acids, monomethyl maleic acids, and mixtures of two or more thereof. Preferably, the α,β-ethylenically unsaturated carboxylic acid comprises acrylic acid, methacrylic acid, or mixtures of acrylic acid and methacrylic acid. More preferably, the α,β-ethylenically unsaturated carboxylic acid consists essentially of acrylic acid, methacrylic acid, or mixtures of acrylic acid and methacrylic acid.

The parent acid copolymers may further comprise copolymerized units of other comonomer(s), such as unsaturated carboxylic acids having 2 to 10, or preferably 3 to 8 carbon atoms or derivatives thereof. Suitable acid derivatives include acid anhydrides, amides, and esters. Esters are preferred derivatives. Specific examples of preferred esters of unsaturated carboxylic acids include, but are not limited to, methyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylate, tert-butyl acrylates, tert-butyl methacrylates, octyl acrylates, octyl methacrylates, undecyl acrylates, undecyl methacrylates, octadecyl acrylates, octadecyl methacrylates, dodecyl acrylates, dodecyl methacrylates, 2-ethylhexyl acrylates, 2-ethylhexyl methacrylates, isobornyl acrylates, isobornyl methacrylates, lauryl acrylates, lauryl methacrylates, 2-hydroxyethyl acrylates, 2-hydroxyethyl methacrylates, glycidyl acrylates, glycidyl methacrylates, poly(ethylene glycol)acrylates, poly(ethylene glycol)methacrylates, poly(ethylene glycol) methyl ether acrylates, poly(ethylene glycol) methyl ether methacrylates, poly(ethylene glycol) behenyl ether acrylates, poly(ethylene glycol) behenyl ether methacrylates, poly(ethylene glycol) 4-nonylphenyl ether acrylates, poly (ethylene glycol) 4-nonylphenyl ether methacrylates, poly (ethylene glycol) phenyl ether acrylates, poly(ethylene glycol) phenyl ether methacrylates, dimethyl maleates, diethyl maleates, dibutyl maleates, dimethyl fumarates, diethyl fumarates, dibutyl fumarates, dimenthyl fumarates, vinyl acetates, vinyl propionates, and mixtures of two or more thereof. Examples of other suitable comonomers include, but are not limited to, methyl acrylates, methyl methacrylates, butyl acrylates, butyl methacrylates, glycidyl methacrylates, vinyl acetates, and mixtures of two or more thereof.

The parent acid copolymers may be synthesized by any suitable polymerization process. For example, the parent acid copolymers may be polymerized as described in U.S. Pat. Nos. 3,404,134; 5,028,674; 6,500,888; and 6,518,365.

To obtain the ionomers used herein, at least a portion of the carboxylic acid moieties of the parent acid copolymers is neutralized to form carboxylate groups. Preferably about 5 to about 90%, more preferably about 10 to about 50%, yet more preferably about 20 to about 50%, or still more preferably about 20 to about 35% of the carboxylic acid groups are neutralized, based on the total carboxylic acid content of the parent acid copolymers. An example of a suitable procedure for neutralizing the parent acid copolymers is also described in U.S. Pat. No. 3,404,134.

The ionomers comprise cations as counterions to the carboxylate anions. Cations include any positively charged species that is stable under the conditions in which the ionomer composition is synthesized, processed and used. Examples of suitable cations include, without limitation, ammonium ions; protonated amines, including primary, secondary and tertiary amines; quaternary amines; protonated aromatic species, such as imidazolium ions, pyrrolidinium ions, and pyridinium ions; phosphonium ions; and metal cations. Preferably, the cations are metal cations that may be monovalent, divalent, trivalent or multivalent. Combinations of two or more metal ions having different valencies, for example mixtures of $Na^+$ and $Zn^{2+}$, are also suitable. Suitable monovalent metal ions include but are not limited to ions of sodium, potassium, lithium, silver, mercury, copper, and the like, and mixtures of two or more thereof. Suitable divalent metal ions include but are not limited to ions of beryllium, magnesium, calcium, strontium, barium, copper, cadmium, mercury, tin, lead, iron, cobalt, nickel, zinc, and the like, and mixtures of two or more thereof. Suitable trivalent metal ions include but are not limited to ions of aluminum, scandium, iron, yttrium, and the like, and mixtures of two or more thereof. Suitable multivalent metal ions include but are not limited to ions of titanium, zirconium, hafnium, vanadium, tantalum, tungsten, chromium, cerium, iron, and the like, and mixtures of two or more thereof. It is noted that when the metal ion is multivalent, complexing agents such as stearate, oleate, salicylate, and phenolate radicals may be included, as described in U.S. Pat. No. 3,404,134. The metal ions are preferably monovalent or divalent ions. More preferably, the metal ions are selected from the group consisting of ions of sodium, lithium, magnesium, zinc, and potassium and mixtures of two or more thereof. Yet more preferably, the metal ions are selected from the group consisting of ions of sodium and zinc and mixtures thereof. Still more preferably, the metal ions comprise or consist essentially of sodium ions.

It is also preferred that the parent acid copolymer have a melt index (MI) of about 60 g/10 min or less, more preferably about 45 g/10 min or less, yet more preferably about 30 g/10 min or less, or most preferably about 25 g/10 min or less, as measured by ASTM method D1238 at 190° C. and 2.16 kg. The resulting ionomer preferably has a MI of about 10 g/10 min or less, more preferably about 5 g/10 min or less, or most preferably about 3 g/10 min or less, when measured under the same conditions. The ionomer also preferably has a flexural modulus greater than about 40,000 psi (276 MPa), more preferably greater than about 50,000 psi (345 MPa), or most preferably greater than about 60,000 psi (414 MPa), as measured by ASTM method D790 (Procedure A).

Sheets comprising such ionomers exhibit greater toughness and transparency relative to the properties that are expected of a sheet comprising an ionomer with a similarly high acid content. Without being held to any particular theory, it is believed that the relatively low MI associated with the parent acid copolymer and the resulting ionomer contributes to the improvements in toughness and transparency. Some ionomers that are suitable for use in the safety glazing provided herein are described in, for example, U.S. Patent Publication No. 20060182983.

The ionomer compositions may further contain additives that effectively reduce the melt flow of the resin, up to but not including the limit of producing an intractable material, for example, one that is not melt processable, or one that does not have useful physical properties. The use of such additives may enhance the upper end-use temperature and reduce creep of the ionomer interlayers comprising the same. Typically, the end-use temperature for the ionomer interlayers may be enhanced by up to about 20 to about 70° C. In addition, laminates comprising such materials have increased fire resistance. Specifically, ionomer compositions including these additives will have a reduced tendency to melt and flow out of the laminate, thus reducing their availability as additional fuel for a fire.

Effective melt flow reducing additives include, without limitation, organic peroxides, such as 2,5-dimethylhexane-2, 5-dihydroperoxide, 2,5-dimethyl-2,5-di(tert-betylperoxy) hexane-3, di-tert-butyl peroxide, tert-butylcumyl peroxide, 2,5-dimethyl-2,5-di(tert-butylperoxy)hexane, dicumyl peroxide, alpha,alpha'-bis(tert-butyl-peroxyisopropyl)benzene, n-butyl-4,4-bis(tert-butylperoxy)valerate, 2,2-bis(tert-butylperoxy)butane, 1,1-bis(tert-butyl-peroxy)cyclohexane, 1,1-bis(tert-butylperoxy)-3,3,5-trimethyl-cyclohexane, tert-butyl peroxybenzoate, benzoyl peroxide, and the like and mixtures combinations thereof. Preferably, the organic peroxides decompose at a temperature of about 100° C. or higher to generate radicals. More preferably, the organic peroxides have a decomposition temperature which affords a half life of about 10 hours at about 70° C. or higher to provide improved stability for blending operations. The organic peroxides may be added at a level of about 0.01 to about 10 wt %, or preferably, about 0.5 to about 3 wt %, based on the total weight of the ionomer interlayer composition.

If desired, initiators, such as dibutyltin dilaurate, may also be contained in the ionomeric composition at a level of about 0.01 to about 0.05 wt %, based on the total weight of the composition. In addition, if desired, inhibitors, such as hydroquinone, hydroquinone monomethyl ether, p-benzoquinone, and methylhydroquinone, may be added for the purpose of enhancing control of the reaction and to stabilize the ionomer composition with respect to oxidative degradation. Typically, the inhibitors are added at a level of less than about 5 wt %, based on the total weight of the composition.

For the sake of process simplification and ease, however, it is preferred that the ionomer composition not incorporate cross-linking additives, such as the abovementioned peroxides and initiators.

The ionomer composition may further comprise any other suitable additive(s) known in the art. Such additives may include, but are not limited to, plasticizers, processing aides, flow enhancing additives, lubricants, pigments, dyes, flame retardants, impact modifiers, nucleating agents, antiblocking agents (e.g., silica), thermal stabilizers, UV absorbers, UV stabilizers, dispersants, surfactants, chelating agents, coupling agents, adhesives, primers, reinforcement additives (e.g., glass fiber), fillers, and the like.

Thermal stabilizers can be used and have been described in the art. Any known thermal stabilizer may find utility in the ionomeric compositions. Preferred general classes of thermal stabilizers include, but are not limited to, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds that react with peroxides, hydroxylamines, nitrones, thiosynergists, benzofuranones, indolinones, and the like and mixtures thereof. The ionomer compositions may contain any effective amount of thermal stabilizers. Use of a thermal stabilizer is optional and in some instances is not preferred. When used, the ionomer compositions contain at least about 0.05 wt %, and up to about 10 wt %, more preferably up to about 5 wt %, and still more preferably up to about 1 wt % of thermal stabilizers, based on the total weight of the composition.

UV absorbers can be used and have also been described in the art. Any known UV absorber may find utility in the ionomeric compositions. Preferred general classes of UV absorbers include, but are not limited to, benzotriazoles, hydroxybenzophenones, hydroxyphenyl triazines, esters of substituted and unsubstituted benzoic acids, and the like and mixtures thereof. The sodium neutralized ionomer compositions may contain any effective amount of UV absorbers. Use of an UV absorber is optional and in some instances is not preferred. When used, the ionomer compositions contain at least about 0.05 wt %, and up about 10 wt %, more preferably up to about 5 wt %, and still more preferably up to about 1 wt % of UV absorbers, based on the total weight of the composition.

Hindered amine light stabilizers (HALS) can be used and have also been described in the art. Generally, hindered amine light stabilizers are secondary or tertiary, acetylated, N-hydrocarbyloxy substituted, hydroxy substituted N-hydrocarbyloxy substituted, or other substituted cyclic amines. The eponymous hindrance is steric hindrance, generally derived from aliphatic substitution of the carbon atoms adjacent to the amine moiety. The sodium neutralized ionomer compositions may contain any effective amount of hindered amine light stabilizers. Use of hindered amine light stabilizers is optional and in some instances is not preferred. When used, the ionomer compositions contain at least about 0.05 wt %, and up to about 10 wt %, more preferably up to about 5 wt %, and most preferably, up to about 1 wt % of hindered amine light stabilizers, based on the total weight of the composition.

Silane coupling agents may be included in the ionomer compositions to enhance the adhesive strength of the ionomer layers to other adjacent laminate layers. Examples of suitable silane coupling agents include, but are not limited to, γ-chloropropylmethoxysilane, vinyltrimethoxysilane, vinyltriethoxysilane, vinyltris(β-methoxyethoxy)silane, γ-vinylbenzylpropyl trimethoxysilane, N-β-(N-vinylbenzylaminoethyl)-γ-aminopropyltrimethoxysilane, γ-methacryloxypropyl-trimethoxysilane, vinyltriacetoxysilane, γ-glycidoxy propyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyl-triethoxysilane, N-β-(aminoethyl)-γ-aminopropyltrimethoxysilane, and mixtures of two or more thereof. The silane coupling agents are preferably incorporated in the ionomer compositions at a level of about 0.01 to about 5 wt %, or more preferably about 0.05 to about 1 wt %, based on the total weight of the composition. The silane coupling agents are preferably used in conjunction with an ionomer composition comprising a sodium neutralized ionomer.

One or more ionomer sheets may independently be in a mono-layer or multi-layer form. By "mono-layer", it is meant that the sheet consists essentially of the ionomer composition described herein. It is understood, however, that, in some instances, a thicker mono-layer ionomer sheet may be formed stacking and bonding two or more thinner sheets of the same ionomer composition. When in a "multi-layer" form, however, as the term is used herein, the ionomer sheet includes two or more sub-layers. At least one of the sub-layers consists essentially of the ionomer composition, while the other sub-layer(s) may comprise or consist essentially of any other suitable polymeric material(s), such as, parent acid copolymers as described above, other ionomers or ionomer compositions as described above, poly(ethylene vinyl acetates), poly (vinyl acetals) (including acoustic grade poly(vinyl acetals)), polyurethanes, polyvinylchlorides, polyethylenes (e.g., linear low density polyethylenes), polyolefin block elastomers, poly(α-olefin-co-α,β-ethylenically unsaturated carboxylic acid ester)s (e.g., poly(ethylene-co-methyl acrylate) and poly (ethylene-co-butyl acrylate)), silicone elastomers, epoxy resins, and combinations of two or more thereof. Preferably, however, the ionomer sheets are in a mono-layer form.

It is preferred that at least one of the ionomer sheets have a thickness of about 2 to about 20 mm, preferably about 2 to about 10 mm, or more preferably about 3 to about 8 mm. Also preferably, each of the remaining ionomer sheets may independently have a thickness of about 1 to about 10 mm, preferably about 2 to about 10 mm, or more preferably about 3 to about 8 mm. It is further preferred that the outermost ionomer sheet (in FIG. 2, this is ionomer sheet 41, the polymeric interlayer that is proximal or closest to the impact force 25) have the smallest thickness, and that the innermost ionomer sheet (in FIG. 2, this is ionomer sheet 43, the polymeric interlayer that is distal to or furthest from the impact force 25) have the greatest thickness.

The ionomer sheets may have a smooth or rough surface on one or both sides. Preferably, the ionomer sheets have rough surfaces on both sides to facilitate the deaeration during the lamination process. Rough surfaces can be made by conventional processes such as mechanical embossing, or by melt fracture during extrusion of the sheets followed by quenching so that the roughness is retained during handling. For example, the as-extruded sheet may be passed over a specially prepared surface of a die roll positioned in close proximity to the exit of the die which imparts the desired surface characteristics to one side of the molten polymer. Thus, when the surface of such a die roll has minute peaks and valleys, the still-impressionable polymer sheet cast on the die roll will have a rough surface on the side that is in contact with the roll. The rough surface generally conforms respectively to the valleys and peaks of the roll surface. Such die rolls are described in, e.g., U.S. Pat. No. 4,035,549 and U.S. Patent Application Publication No. 2003-0124296.

The ionomer sheets may be produced by any suitable process. For example, the sheets may be formed through dipcoating, solution casting, compression molding, injection molding, lamination, melt extrusion, blown film, extrusion coating, tandem extrusion coating, or any other suitable procedure. Preferably, the sheets 41 and 43 are formed by a melt extrusion, melt coextrusion, melt extrusion coating, or tandem melt extrusion coating process.

Turning now to the anti-spall zone, in general, it may include any suitable anti-spall technology. For example, the layers of adhesive 50 and of abrasion-resistant polycarbonate 60 described above with respect to safety glazing 100 depicted in FIG. 1 are suitable for use in the safety glazing provided herein. Likewise, U.S. Pat. No. 5,002,820 describes an anti-spall zone formed of an ionomer sheet and a 0.3 to 1.8 mm thick glass sheet. In addition, PCT Patent Publication No. WO03068501 describes an anti-spall zone formed of an ionomer sheet and a chemically strengthened thin glass sheet. U.S. Pat. No. 5,567,529 describes an anti-spall zone formed of a composite of a PVB sheet and a polyethylene terephthalate) (PET) film. Moreover, U.S. Patent Publication No. 20020160198 describes a fracture-proof plastic film (i.e., a polyethylene, polyester, poly(vinyl chloride), or polycarbonate film) as the innermost surface of a bullet resistant glazing. Finally, other anti-spalling technologies described above in the Background of the Invention may also be suitable for use in the safety glazing described herein.

In particular, however, a preferred anti-spall zone 22 is depicted in FIG. 2. It comprises a polymeric sheet 45 and a polymer film 80. The polymeric sheet 45 is adjacent to the innermost glass sheet 34 comprised in the impact zone 10. Polymer film 80, which is opposite from or distal to the impact force 25, serves as an outermost layer of safety glazing 200. Optionally, polymer film 80 may be coated, in whole or in part, with an adhesive or primer layer 70. Also optionally, polymer film 80 may be coated, in whole or in part, with a hardcoat 90. The innermost glass sheet 34 in the impact zone 11 is adhered firmly to the polymeric sheet 45 of the anti-spall zone 20. Preferably, the glass sheet 34 is laminated directly to polymeric sheet 45 so that the sheets are adjacent, more preferably adjoining, and still more preferably contiguous.

Polymers suitable for use in the polymer film 80 include, but are not limited to, poly(ethylene terephthalate) (PET), polycarbonate, polypropylene, polyethylene, polypropylene, cyclic polyolefins, norbornene polymers, polystyrene, syndiotactic polystyrene, styrene-acrylate copolymers, acrylonitrile-styrene copolymers, poly(ethylene naphthalate), polyethersulfone, polysulfone, nylons, poly(urethanes), acrylics, cellulose acetates, cellulose triacetates, cellophane, vinyl chloride polymers, polyvinylidene chloride, vinylidene chloride copolymers, fluoropolymers, polyvinyl fluoride, polyvinylidene fluoride, polytetrafluoroethylene, ethylene-tetrafluoroethylene copolymers, and combinations of two or more of these polymers.

Preferably, polymer film 80 is a bi-axially oriented PET film or a fluoropolymer film such as a poly(vinyl fluoride) film and or a poly(vinylidene fluoride) film. Some fluoropolymer films are commercially available from DuPont under trademarks Tedlar® and Tefzel®. More preferably, polymer film 80 is a bi-axially oriented PET film. Yet more preferably, polymer film 80 is a bi-axially oriented PET film having (i) a tensile modulus of about 600,000 psi (4.14 GPa) or higher at both machine direction (MD) and transverse direction (TD), (ii) a shock brittleness index of about 55 joule or higher at MD and about 25 joule or higher at TD, and (iii) a percent elongation at break (EOB) of about 110 to about 160 at MD and about 60 to about 110 at TD. These preferred films are described in further detail in U.S. Provisional Application No. 61/070,800, filed on Mar. 26, 2008.

Polymer film 80 may have a thickness of about 3 to about 10 mil (about 0.076 to about 0.26 mm), or yet more preferably about 4 to about 7 mil (about 0.10 to about 0.18 mm).

Polymer film 80 is preferably coated, in whole or in part, with a transparent abrasion resistant hardcoat 90. Hardcoat 90 may be disposed on one or both surfaces of polymer film 80. More preferably, the polymer film 80 bears a hardcoat 90 on its outside surface, which is the surface opposite from or distal to the impact force 25. Any material known for use in abrasion resistant hardcoats may be used in the safety glazing provided herein. For example, the hardcoat 90 may comprise polysiloxanes or cross-linked (thermosetting) polyurethanes. Also suitable are oligomeric-based coatings, such as those described in U.S. Patent Application Publication No. 20050077002, which are prepared by the reaction of (A) hydroxyl-containing oligomer with isocyanate-containing oligomer or (B) anhydride-containing oligomer with epoxide-containing compound. Preferably, however, the hardcoat 90 comprises a polysiloxane abrasion resistant coating (PARC), such as those described in U.S. Pat. Nos. 4,177,315; 4,469,743; 5,415,942; and 5,763,089.

Still referring to FIG. 2, it is also preferred that one or both surfaces of the polymer film 80 be treated to enhance its adhesion to the other laminate layers or to hardcoat 90. This treatment may take any suitable form. For example, the surface treatments may include, without limitation, energy treatments and the application of adhesives or primers. Suitable energy treatments include, without limitation, controlled flame treatment and plasma treatment. Suitable flame treating techniques include, without limitation, those described in U.S. Pat. Nos. 2,632,921; 2,648,097; 2,683,984; and 2,704,382, and suitable plasma treating techniques include, without limitation, those described in U.S. Pat. No. 4,732,814. Suitable adhesives or primers include, without limitation, silanes, poly(alkyl amines), and acrylic based primers. An optional layer 70 of adhesive or primer is depicted in FIG. 2.

Examples of suitable silanes include, without limitation, vinyltriethoxysilane, vinyltrimethoxysilane, vinyltris(beta-methoxyethoxy)silane, γ-methacryloxypropyltrimethoxysilane, β-(3,4-epoxycyclohexyl) ethyltrimethoxysilane, γ-glycidoxypropyltrimethoxysilane, γ-glycidoxypropyl methyldiethoxysilane, vinyl-triacetoxysilane, γ-mercaptopropyltrimethoxysilane, (3-aminopropyl)trimethoxysilane, (3-aminopropyl)triethoxysilane, N-β-(aminoethyl)-γ-aminopropyl-trimethoxysilane, N-(β-aminoethyl)-γ-aminopropylmethyldimethoxysilane, aminoethylaminopropyl silane triol homopolymer, vinylbenzylaminoethylaminopropyltrimethoxysilane, and mixtures of two or more thereof. Preferably, however, the silane is an aminosilane, such as, (3-aminopropyl)trimethoxysilane, (3-aminopropyl)triethoxysilane, N-β-(aminoethyl)-γ-aminopropyl-trimethoxysilane, N-β-(aminoethyl)-γ-aminopropylmethyldimethoxysilane, aminoethylaminopropyl silane triol homopolymer, vinylbenzylaminoethylaminopropyltrimethoxysilane, bis(trimethoxysilylpropyl)amine, or mixtures of two or more thereof. Commercially available examples of aminosilanes include DOW CORNING™ Z-6011, Z-6020, Z-6040, Z-6075, Z-6130, Z-6132, Z-6137, Z-6142, Z-6172, Z-6300, and Z-6518 Silane (Dow Corning Corporation, Midland, Mich.) and SILQUEST™ A-151, A-171, A-172, A-187, A-1100, A-1102, A-1110, A-1120, A-1170, and A-2120 Silanes (Momentive Performance Materials, Wilton, Conn.).

Suitable poly(alkyl amines) include those derived from α-olefin comonomers having 2 to 10 carbon atoms, such as ethylene, propylene, 1-butene, 1 pentene, 1-hexene, 1-heptene, 3 methyl-1-butene, 4-methyl-1-pentene, and mixtures thereof. Preferably, the poly(alkyl amine) is selected from poly(allyl amines), poly(vinyl amines) and combinations of poly(allyl amines) and poly(vinyl amines). An example of a suitable poly(alkyl amine) is linear poly(vinyl amine), available from the BASF Corporation, Florham Park, N.J., under the tradename LUPAMIN™ 9095. More preferably, however, the poly(alkyl amine) is a poly(allyl amine), or linear poly(allyl amine). Some preferred poly(allyl amine) primers or coatings, and their application to polyester film surface(s), are described in U.S. Pat. Nos. 5,411,845; 5,770,312; 5,690,994; and 5,698,329.

Some suitable acrylic based primers, such as hydroxyacrylic hydrosol primers, are described in U.S. Pat. No. 5,415,942.

The adhesives or primers may be applied through melt processes or through solution, emulsion, dispersion, and other coating processes. One of ordinary skill in the art will be able to identify appropriate process parameters based on the composition and process used for the coating formation. For example, the adhesive or primer composition may be cast, sprayed, air knifed, brushed, rolled, poured or printed or the like onto the surface of polymer film 80. Generally the adhesive or primer is diluted into a liquid medium prior to application to provide uniform coverage over the film surface. The liquid medium may function as a solvent for the adhesive or primer to form solutions. Alternatively, it may function as a non-solvent for the adhesive or primer to form dispersions or emulsions. Adhesive or primer coatings 70 may also be applied by spraying.

The polymer film 80 may further comprise one or more other functional coatings (e.g., oxygen and moisture barrier coatings) on at least a portion of one or both surfaces thereof. For example, the metal oxide coating described in U.S. Pat. Nos. 6,521,825 and 6,818,819 and European Patent No. EP 1 182 710 may be applied to one or both surfaces of the polymer film 80.

The anti-spall polymer sheet 45 may comprise a polymer material selected from poly(vinyl acetals) (e.g., poly(vinyl butyrals) (PVBs)), ionomers, poly(ethylene vinyl acetates), polyurethanes, poly(vinyl chlorides), polyethylenes (e.g., linear low density polyethylenes), polyolefin block elastomers, ethylene acrylate ester copolymers (e.g., poly(ethylene-co-methyl acrylate) and poly(ethylene-co-butyl acrylate)), acid copolymers, silicone elastomers, epoxy resins, and combinations of two or more thereof. Preferably, the polymer interlayer sheet 45 comprises a PVB composition. Suitable poly(vinyl butyral)s and PVB compositions are as described above with respect to glass-clad polycarbonate safety glazing 100. The polymer sheet 45 may have a thickness of about 10 to about 100 mils (about 0.25 to about 2.54 mm).

Referring again to FIG. 2, the ballistic resistant safety glazing 200 may be described as consisting essentially of an impact zone 11 and an anti-spall zone 22. The impact zone 11 consists essentially of a first glass sheet 30 having a surface that is contiguous with a first surface of a first ionomer sheet 41; a second glass sheet 32 having a first surface that is contiguous with a second surface of said first ionomer sheet 30; a second ionomer sheet 43 having a first surface that is contiguous with a second surface of said second glass sheet 32; and a third glass sheet 34 having a first surface that is contiguous with a second surface of said second ionomer sheet 43. The anti-spall zone 22 consists essentially of a PVB sheet 45 having a first surface that is contiguous with a second surface of said third glass sheet 34; and a bi-axially oriented PET film 80 having a first surface that is contiguous with a second surface of said PVB sheet 45.

In a preferred method of preparation, the anti-spall polymer sheet 45 and the polymer film 80 are formed into a bi-layer composite in a first step before they are further laminated to the other layers (e.g., glass sheet 34 of the safety glazing 200). In this method, the optional hardcoat 90 and adhesive or primer coating 70, if used, are preferably in place on the surface(s) of polymer film 80 before the first step in which the bi-layer composite is formed.

Any suitable process may be used to produce the preformed bi-layer composite. For example, the bi-layer composite may be produced through co-extrusion or extrusion coating. Preferably, however, the pre-formed bi-layer composite is produced through lamination of the polymer sheet 45 and the polymer film 80.

For example, the polymer sheet 45 (e.g., a PVB interlayer sheet) may be lightly bonded to the polymer film 80 (e.g., a PET film) through a nip roll bonding process. In such a process, the polymer film 80 may be supplied from a roll and the anti-spall polymer sheet 45 may be supplied from a roll or as flat sheet stock. Each of the polymer film 80 and the anti-spall polymer sheet 45 may be first passed over a tension roll and then subjected to moderate heating by passing through a heating zone (e.g., as an oven). The temperature at which the heating zone is maintained is sufficient to promote temporary fusion bonding, i.e., to cause the surfaces of the film 80 or sheet 45 to become tacky. For example, in the case a PVB anti-spall sheet 45 is used, the heating zone may be maintained at a temperature such that the surface temperature of the PVB sheet 45 reaches about 50° C. to about 120° C., or preferably about 65° C. The PET film 80 and the PVB sheet 45 are then fed through nip rolls where the two layers are merged together under moderate pressure to form a weakly bonded laminate. If desired, the nip rolls may be heated to promote the bonding process. The bonding pressure exerted by the nip rolls may vary depending upon the film and/or sheet materials and the temperatures employed in the heating zone or the nip rolls. Generally the bonding pressure may be within the range of about 10 to about 75 psi (0.7 to about 5.3 kg/cm$^2$), preferably about 25 to about 30 psi (1.8 to about 2.1 kg/cm$^2$). The tension between the PVB sheet 45 and the PET film 80 is controlled by passage over an idler roll. Typical line speeds through the roll assembly are within the range of about 5 to about 30 feet (about 1.5 to about 9.2 m) per minute. Proper control of the speed and the tension tends to minimize wrinkling of the film. After bonding, the pre-formed bi-layer composite is passed over a series of cooling rolls to ensure that the sheet is not tacky when taken up on a roll. Water cooling is generally sufficient to achieve this objective. Tension within the system may be further maintained through the use of idler rolls. Some examples of pre-formed bi-layers and methods of making them are described in U.S. Pat. Nos. 5,415,942; 5,069,942 and 7,189,457.

Suitable pre-formed bi-layer composites of PVB sheets 45 and PET films 80 are commercially available from DuPont under the trademark Spallshield®. For example, Spallshield® 3010 is a bi-layer composite of a 30 mil (0.76 mm) thick PVB sheet and a 10 mil (0.25 mm) thick PET film; Spallshield® 1510 is a bi-layer composite of a 15 mil (0.38 mm) thick PVB sheet and a 10 mil (0.25 mm) thick PET film; and Spallshield® 307 is a bi-layer composite of a 30 mil (0.76 mm) thick PVB sheet and a 7 mil (0.18 mm) thick PET film.

Any suitable lamination process may be used to prepare the safety glazing provided herein. First, if desired, one or both surfaces of any of the component layers of the safety glazing may undergo any suitable adhesion enhancing treatment, as described above, prior to the lamination process. Next, for example, in an autoclave process, the component layers of a safety glazing are stacked up in the desired order to form a pre-lamination assembly. The assembly is then placed into a bag capable of sustaining a vacuum ("a vacuum bag"). A vacuum ring may be substituted for the vacuum bag. One type of suitable vacuum bag is described in U.S. Pat. No. 3,311,517. The air is drawn out of the vacuum bag using a vacuum line or other means, the bag is sealed while the vacuum is maintained (e.g., at about 27 to 28 in Hg (689-711 mm Hg)), and the sealed bag is placed in an autoclave. The sealed bag containing the assembly is processed in the autoclave at a pressure of about 150 to about 250 psi (about 11.3 to 18.8 bar), and at a temperature of about 110° C. to about 180° C., or about 120° C. to about 160° C., or about 135° C. to about 160° C., for about 10 to about 90 min, or about 20 to about 70 min, or about 25 to about 60 min. Following the heat and pressure cycle, the air in the autoclave is cooled without adding additional gas; thus, the pressure inside the autoclave is allowed to decrease. After about 20 min of cooling, the autoclave is vented to the atmosphere and the sealed bag containing the laminate is removed from the autoclave.

Alternatively, the pre-lamination assembly may be heated in an oven at about 80° C. to about 120° C., or about 90° C. to about 100° C., for about 20 to about 40 min. Thereafter, the heated assembly is passed through a set of nip rolls so that the air in the void spaces between the individual layers may be squeezed out, and so that the edge of the assembly may be sealed. The assembly at this stage is referred to as a pre-press assembly.

The pre-press assembly may then be placed in an air autoclave and processed at a temperature of from about 120° C. to about 160° C., or about 135° C. to about 160° C., and at a pressure of about 100 to about 300 psi (about 6.9 to about 20.7 bar), or about 200 psi (13.8 bar). These conditions may be maintained for about 15 to about 60 min, or about 20 to about 50 min. Following the heat and pressure cycle, the air in the autoclave is cooled without adding additional gas. After about 20 to about 40 min of cooling, the excess air pressure is vented and the laminated products are removed from the autoclave.

The safety glazing may also be produced through non-autoclave processes. Such non-autoclave processes are described, for example, in U.S. Pat. Nos. 3,234,062; 3,852,136; 4,341,576; 4,385,951; 4,398,979; 5,536,347; 5,853,516; 6,342,116; and 5,415,909, U.S. Patent Publication No. 20040182493, European Patent No. EP1235683 B1, and PCT Patent Publication Nos. WO9101880 and WO03057478. Generally, the non-autoclave processes include heating the pre-lamination assembly and the application of vacuum, pressure or both. For example, the assembly may be successively passed through heating ovens and nip rolls.

As is demonstrated in the Examples, below, the safety glazing described herein exhibits high transparency due to the use of ionomer sheets with low haze. Moreover, when samples of safety glazing have a comparable level of ballistic resistance, as measured by meeting the same ballistic resistance standard(s), the safety glazing described herein surprisingly has a lower areal density when compared to other samples of safety glazing. It follows by a simple conversion that the safety glazing described herein also weighs less than the other safety glazing, provided that both have an equal projected area.

Further, as is noted above, safety glazing with ballistic resistance is often used to replace conventional glazing or conventional safety glazing in vehicles, buildings and other structures. The improvement in transparency associated with the safety glazing provided herein makes it more desirable, compared to other ballistic resistant safety glazing such as safety glazing, in applications such as windows and moon roofs. In addition, the reduction in areal density associated with the safety glazing provided herein is also a significant advantage over other types of ballistic resistant safety glazing. For example, a civilian automobile typically has an area of about 4 to about 6 m$^2$ covered by transparent glass. Thus, when the glass-clad polycarbonate safety glazing in an automobile is replaced with the transparent ballistic resistant safety glazing provided herein, even a small reduction in the areal density can yield a significant reduction in the overall weight of the automobile.

Accordingly, further provided herein are articles comprising the laminated safety glazing provided herein. The articles include, but are not limited to, civilian cars, military vehicles, cash trucks, armored cars, other armored vehicles such as tanks or boats, buildings, high speed trains, aircraft, construction equipment, and farm equipment. The safety glazing described herein may be installed in these articles by known methods, or by making readily available adaptations to known methods. For example, methods and equipment for replacing windshields are known, and those of skill in the art will be able to adapt conventional methods and equipment to the safety glazing described herein. See, for example, U.S. Pat. No. 7,232,181.

The following examples are provided to describe the invention in further detail. These examples, which set forth a preferred mode presently contemplated for carrying out the invention, are intended to illustrate and not to limit the invention.

EXAMPLES

Material and Methods

Melt Flow Indices
Melt flow indices (MI) were determined in accordance with ADTM D1238 at 190° C., 2.16 kg.
Ionomers and Other Resins:
ION A was a poly(ethylene-co-methacrylic acid) containing 21.7 wt % of polymerized residues of methacrylic acid that was 5% neutralized, having zinc counterions and a MI of 15 g/10 min. The parent poly(ethylene-co-methacrylic acid) had a MI of 23 g/10 min prior to neutralization.
ION B was a poly(ethylene-co-methacrylic acid) containing 15 wt % of polymerized residues of methacrylic acid that was 17% neutralized, having zinc counterions and a MI of 5.9 g/10 min. The parent poly(ethylene-co-methacrylic acid) had a MI of 25 g/10 min prior to neutralization.
ION C was a poly(ethylene-co-methacrylic acid) containing 21.7 wt % of polymerized residues of methacrylic acid that was 15% neutralized, having zinc counterions and a MI of 5.4 g/10 min. The parent poly(ethylene-co-methacrylic acid) had a MI of 23 g/10 min prior to neutralization.
ION D was a poly(ethylene-co-methacrylic acid) containing 21.7 wt % of polymerized residues of methacrylic acid that was 25% neutralized, having zinc counterions and a MI of 1.7 g/10 min. The parent poly(ethylene-co-methacrylic acid) had a MI of 23 g/10 min prior to neutralization.
ION E was a poly(ethylene-co-methacrylic acid) containing 19 wt % of polymerized residues of methacrylic acid that was 36% neutralized, having zinc counterions and a MI of 1 g/10 min. The parent poly(ethylene-co-methacrylic acid) had a MI of 60 g/10 min prior to neutralization.
ION F was a polyethylene-co-methacrylic acid) containing 21.7 wt % of polymerized residues of methacrylic acid that was 35% neutralized, having zinc counterions and a MI of 0.6 g/10 min. The parent poly(ethylene-co-methacrylic acid) had a MI of 23 g/10 min prior to neutralization.
ION G was a poly(ethylene-co-methacrylic acid) containing 21.7 wt % of polymerized residues of methacrylic acid that was 15% neutralized, having sodium counterions and a MI of 3.4 g/10 min. The parent poly(ethylene-co-methacrylic acid) had a MI of 23 g/10 min prior to neutralization.
ION H was a poly(ethylene-co-methacrylic acid) containing 21.7 wt % of polymerized residues of methacrylic acid that was 20% neutralized, having sodium counterions and a MI of 2.3 g/10 min. The parent poly(ethylene-co-methacrylic acid) had a MI of 23 g/10 min prior to neutralization.
ION I was a poly(ethylene-co-methacrylic acid) containing 21.7 wt % of polymerized residues of methacrylic acid that was 25% neutralized, having sodium counterions and a MI of 1.5 g/10 min. The parent poly(ethylene-co-methacrylic acid) had a MI of 23 g/10 min prior to neutralization.
ION J was a poly(ethylene-co-methacrylic acid) containing 21.7 wt % of polymerized residues of methacrylic acid that was 26% neutralized, having sodium counterions and a MI of 1.8 g/10 min. The parent poly(ethylene-co-methacrylic acid) had a MI of 23 g/10 min prior to neutralization.
ION K was a poly(ethylene-co-methacrylic acid) containing 19 wt % of polymerized residues of methacrylic acid that was 37% neutralized, having sodium counterions and a MI of 2.6 g/10 min. The parent poly(ethylene-co-methacrylic acid) had a MI of 60 g/10 min prior to neutralization.
ION L was a poly(ethylene-co-methacrylic acid) containing 21.7 wt % of polymerized residues of methacrylic acid that was 30% neutralized, having sodium counterions and a MI of 0.9 g/10 min. The parent poly(ethylene-co-methacrylic acid) had a MI of 23 g/10 min prior to neutralization.
PU was a 1.9 mm thick polyurethane film obtained from Stevens Urethane, Easthampton, Mass.;
PC was a 2.5 mm thick polycarbonate sheet obtained from Sheffield Plastics Inc., Sheffield, Mass.;
PET-1 was a 0.18 mm thick Melinex® film from DuPont Teijin Films, which was on one side primed with a poly (allyl amine) based primer as disclosed in U.S. Pat. No.

7,189,457 and on the other side coated with an abrasion resistant hardcoat as disclosed in European Patent No. 157030.

PET-2 was a 0.18 mm PET film having a shock brittleness of 0.7 joule at MD and 18.8 joule at TD, a tensile modulus of 490,000 psi at MD and 510,000 psi at TD and a percent elongation at break of 194% at MD and 135% at TD. (A. detailed description of the film can also be found in U.S. Provisional Application No. 61/070,800, filed on Mar. 26, 2008.) The film was also primed and hardcoated as disclosed for PET-1.

PVB was a poly(vinyl butyral) sheet from DuPont.

Sheeting Process:

The ionomer resins were fed into 25 mm diameter Killion extruders under the temperature profile set forth in Table 1. They were extrusion cast into polymer sheets.

TABLE 1

| Extruder Zone | Temperature (° C.) |
| --- | --- |
| Feed | Ambient |
| Zone 1 | 100-170 |
| Zone 2 | 150-210 |
| Zone 3 | 170-230 |
| Adapter | 170-230 |
| Die | 170-230 |

The polymer flow rate was controlled by adjusting the screw speed to maximum throughput. The extruder fed a 150 mm slot die with a nominal gap of 2 mm. The as-cast sheet was fed onto a 200 mm diameter polished chrome chill roll held at a temperature of between 10° C. and 15° C. rotating at 1 to 2 rpm. The nominally 0.76 mm (30 mil) thick sheets were then removed and cut into 300×300 mm squares.

Lamination Process 1 for Glass Laminates:

Annealed glass sheets (100×100×3 mm) were washed with a solution of trisodium phosphate (5 g/l) in de-ionized water at 50° C. for 5 min, then rinsed thoroughly with de-ionized water and dried. Three layers of each ionomer sheet (about 0.76 mm thick each) were stacked together and placed between two lites of glass sheet to yield a pre-lamination assembly having an interlayer with a thickness of 2.28 mm. The moisture level of the ionomer sheets was kept below 0.06 wt % by minimizing exposure to the ambient environment, which had a relative humidity (RH) of about 35%. The pre-lamination assembly was then taped together with a piece of polyester tape in several locations to maintain relative positioning of each layer with the glass sheets. A nylon fabric strip was placed around the periphery of the assembly to facilitate air removal from within the layers. The assembly was placed inside a nylon vacuum bag, which was sealed and connected to a vacuum pump. The air was substantially removed from within the bag by reducing the pressure inside the bag to below 50 millibar absolute. The bagged assembly was heated in a convection air oven to 120° C., held at 120° C. for 30 min, cooled down to near room temperature, and disconnected from the vacuum pump. The fully pre-pressed assembly, which was now hermetically sealed around the periphery but still had a few areas that had not been fully bonded (bubbles), was removed from the bag and placed into an air autoclave where the temperature and pressure were increased from ambient to 135° C. and 13.8 bar over 15 min. This temperature and pressure was held for 30 min before the temperature was decreased to 40° C. at Cooling Rate A of 2.5° C./min or Cooling Rate B of 0.1° C./min. In conjunction with this cooling, the pressure was decreased back to ambient over a period of 15 min. The final laminates were then removed from the autoclave.

Lamination Process 2 for Safety Glazings:

The component layers of each glazing laminate, with the dimensions of 500 mm×500 mm, were stacked to form a pre-lamination assembly. For the assemblies containing a polymeric film layer as the outer surface layer, a cover glass sheet was placed over the film layer. The pre-lamination assembly was placed in a vacuum bag, which was then sealed and connected to a vacuum pump. A vacuum was applied through the vacuum pump to remove the air from the vacuum bag and from between the assembly layers. The bagged assembly was processed in an autoclave under air at 135° C. and 200 psig (14.3 bar) for 60 min. Without adding further air to the autoclave, the air in the autoclave was cooled for about 20 min or until the temperature reached less than about 50° C. The autoclave was then vented to the atmosphere, and the final laminate was removed from the vacuum bag.

Lamination Process 3 for Safety Glazings:

The component layers of each glazing laminate, with the dimensions of 500 mm×500 mm, were stacked to form a pre-lamination assembly. The assembly was placed into a vacuum bag and evacuated for 30 minutes at room temperature to remove excess air from between the assembly layers. The bagged assembly was then placed in an air autoclave where the temperature was raised to 160° F. and the pressure to 125 psig. These conditions were maintained for 30 minutes. Thereafter, the temperature was further raised to 260° F. Such conditions were maintained for 60 minutes. Next the air was cooled while no more air is added to the autoclave. After 80 minutes of cooling and when the air temperature in the autoclave was reduced to 100° F., the autoclave was vented to release excess air pressure, and the final laminate was removed from the vacuum bag. The total time from start to finish was about 5 hours.

Haze Measurement:

The glass laminates were thoroughly cleaned using Windex™ glass cleaner and lintless cloths. They were inspected to ensure that they were substantially free of bubbles and other defects that might interfere with the acquisition of valid optical measurements. The haze level of each laminate was then determined using a Haze-gard Plus hazemeter (BYK-Gardner, Columbia, Md.) in accordance with American National Standard (ANSI Z26.1-1966) "Safety Code for Safety Glazing Materials for Glazing Motor Vehicles Operating on Land Highways." Haze levels are reported as the percentage of light that is deflected more than 2.5° from the incident light direction. Higher percentages, therefore, correspond to higher levels of haze.

Ballistic Testing Standards:

The safety glazings described below were subjected to the following ballistic testing standards:

European Standard EN 1063:1999, Level BR4:
  Type of Weapon: hand gun;
  Calibre: 0.44 Remington Magnum;
  Type of Bullet: full copper alloy jacket, flat nose, soft core (lead);
  Mass of Bullet: 15.6±0.1 g;
  Test Range: 5.00±0.5 m;
  Bullet Velocity: 440±10 m/s;
  Number of Strikes: 3; and
  Striking Distance: 120±10 mm.

National Institute of Justice (NIJ) Standard 0108.01, Level IIIA:
  Test Ammunition: 44 Magnum Lead Semi-wadcutter Gas checked;

Nominal Bullet Mass: 15.55 g;
Barrel length: 14 to 16 cm;
Bullet Velocity 426±15 m/s;
Number of Strikes: 5.
National Institute of Justice (NIJ) Standard 0108.01, Level III:
Test Ammunition: 7.62 mm 308 Winchester Full Metal Jacket;
Nominal Bullet Mass: 9.7 g;
Barrel length: 56 cm;
Bullet Velocity 838±15 m/s;
Number of Strikes: 5.
National Institute of Justice (NIJ) Standard 0108.01, Level IIA:
Test Ammunition: 357 Magnum Jacketed Soft Point;
Nominal Bullet Mass: 10.2 g;
Barrel length: 10 to 12 cm;
Bullet Velocity 381±15 m/s;
Number of Strikes: 5.
National Institute of Justice (NIJ) Standard 0108.01, Level II:
Test Ammunition: 357 Magnum Jacketed Soft Point;
Nominal Bullet Mass: 10.2 g;
Barrel length: 15 to 16.5 cm;
Bullet Velocity 425±15 m/s;
Number of Strikes: 5.
National Institute of Justice (NIJ) Standard 0108.01, Level I:
Test Ammunition: 38 Special Round Nose Lead;
Nominal Bullet Mass: 10.2 g;
Barrel length: 15 to 16.5 cm;
Bullet Velocity 259±15 m/s;
Number of Strikes: 5.
Or
Test Ammunition: 22 Long Rifle High Velocity Lead;
Nominal Bullet Mass: 2.6 g;
Barrel Length: 15 to 16.5 cm;
Bullet Velocity: 320±12 m/s;
Number or Strikes: 5.

Comparative Examples CE1-3 and Examples E1-9

Samples CE1-3 and E1-9 were glass laminates prepared by Lamination Process 1. Using the ionomer resins listed in Table 2, the ionomer interlayer sheets were produced by the Sheeting Process described above. The haze level of the glass laminates was measured, and these results are also set forth in Table 2.

In general, as the cooling rate decreased, the haze level of the laminates increased. The results also show that ionomers derived from parent acid copolymers with higher acid levels (e.g., 21.7 wt % in E2 through E9) are characterized by lower haze than the ionomers derived from parent acid copolymer with lower acid levels (e.g., 15 or 19 wt % in CE1 to CE3).

TABLE 2

| Example | Ionomer | Haze (%) | |
| --- | --- | --- | --- |
| | | Cooling Rate A | Cooling Rate B |
| E1 | ION A | 3.9 | 32.1 |
| CE1 | ION B | 31.5 | 98.3 |
| E2 | ION C | 2.2 | 14.8 |
| E3 | ION D | 1.4 | 10.3 |
| CE2 | ION E | 6.4 | 27.4 |
| E4 | ION F | 0.9 | 8.5 |
| E5 | ION G | 1.5 | 12.7 |

TABLE 2-continued

| Example | Ionomer | Haze (%) | |
| --- | --- | --- | --- |
| | | Cooling Rate A | Cooling Rate B |
| E6 | ION H | 1.1 | 7.2 |
| E7 | ION I | 0.9 | 4.4 |
| E8 | ION J | 0.8 | 5.2 |
| CE3 | ION K | 1 | 22.5 |
| E9 | ION L | 1 | 3.3 |

Comparative Examples CE4 to CE9 and Examples E10 to E30

Table 3 (below) describes the component layer structures of each of the laminated safety glazings of CE4 to CE9 and E10 to E30, with layer 1 being the outermost layer of the impact zone, i.e., the layer that is the closest to the impact force. The laminated safety glazings in CE7 to CE9 and E10 to E30 were prepared following Lamination Process 2, and the laminated safety glazings in CE4 to CE6 were prepared following Lamination Process 3.

The laminated safety glazings were further subjected to testing according to various ballistic standards. These results are reported in Tables 4 and 5 (below). First, four of the safety glazings provided herein (E10, E11, E29 and E30), along with a prior art safety glazing (CE4), were tested according to the EN1063:1999, Level BR4 ballistic standard. The E10, E11 and E29 glazings passed the test, while the CE4 sample failed. Moreover, it is noted that at comparable thickness, the E10, E11 and E29 samples have less areal density than the CE4 glazing. Consistently with the standard, sample E30 "passed with splinters." That is, although some splintered glass was observed, the test bullet did not penetrate the E30 laminate.

Another example of the safety glazings provided herein (E12), along with a prior art safety glazing (CE5) were tested according to NIJ Standard 0108.01, Level IIIA. Although both E12 and CE5 passed the test, E12 had much lower areal density than CE5. Safety glazings CE7 and CE9 have structures that are similar to that of E12, except that an ionomer sheet comprised in the impact zone of E12 was replaced with a PVB sheet in CE7 and CE9. The CE9 sample had a thickness and areal density that are comparable to those of example E12; however, CE9 failed to meet the NIJ Standard 0108.01, Level IIIA. Comparative Example CE7 met the NIJ Standard 0108.01, Level IIIA; however, it was thicker and weighed more than E12.

Three examples of the safety glazings provided herein (E13, E14 and E15), along with a prior art safety glazing (CE6) were tested according to NIJ Standard 0108.01, Level III. Although all four of these glazings met the standard, CE6 weighed much more than any of E13, E14 and E15.

The bullet energy used in NIJ Standard 0108.01, Level II testing was 921 joules while the bullet energy used in NIJ Standard 0108.01, Level IIA testing was 740 joules. Two examples of the safety glazings provided herein (E16 and E17) met the NIJ Standard 0108.01, Level II. CE8 had a structure similar to that of E16 and E17, except that the ionomer comprised in the ionomer sheet was derived from a parent acid copolymer with a lower acid level (19 wt %). It is believed that the use of ionomer sheets with less toughness resulted in CE8 failing to meet the NIJ Standard 0108.01, Level IIA.

Examples E18 through E28 were variations of the safety glazings provided herein. The impact zone of each of these laminates consists of only two glass sheets and one ionomer sheet. They all met the NIJ Standard 0108.01, Level I, except that E19 and E20 failed the test when a 38 Special Round Nose Lead ammunition was used.

TABLE 3

| Sample | Layer 1 | Layer 2 | Layer 3 | Layer 4 | Layer 5 | Layer 6 |
|---|---|---|---|---|---|---|
| CE4 | Glass (8 mm) | PVB (0.76 mm) | Glass (8 mm) | PU (1.9 mm) | PC (2.5 mm) | |
| CE5 | Glass (8 mm) | PVB (0.76 mm) | Glass (8 mm) | PU (1.9 mm) | PC (2.5 mm) | |
| CE6 | Glass (8 mm) | PVB (0.76 mm) | Glass (10 mm) | PVB (0.76 mm) | Glass (8 mm) | PVB (0.76 mm) |
| CE7 | Glass (6 mm) | PVB (0.38 mm) | Glass (6 mm) | ION J (5 mm) | Glass (2.5 mm) | PVB (0.38 mm) |
| CE8 | Glass (5 mm) | ION K (1.5 mm) | Glass (4 mm) | ION K (3 mm) | Glass (4 mm) | PVB (0.76 mm) |
| CE9 | Glass (6 mm) | PVB (1.5 mm) | Glass (6 mm) | ION J (3 mm) | Glass (2 mm) | PVB (0.76 mm) |
| E10 | Glass (6 mm) | ION J (1.5 mm) | Glass (6 mm) | ION J (5 mm) | Glass (1.5 mm) | PVB (1.14 mm) |
| E11 | Glass (6 mm) | ION J (1.5 mm) | Glass (6 mm) | ION J (5 mm) | Glass (2.5 mm) | PVB (1.52 mm) |
| E12 | Glass (6 mm) | ION J (1.5 mm) | Glass (6 mm) | ION J (3 mm) | Glass (2 mm) | PVB (0.76 mm) |
| E13 | Glass (1.5 mm) | ION J (1.5 mm) | Glass (8 mm) | ION J (1.5 mm) | Glass (10 mm) | ION J (1.5 mm) |
| E14 | Glass (1.5 mm) | ION J (1.5 mm) | Glass (8 mm) | ION J (1.5 mm) | Glass (10 mm) | ION J (1.5 mm) |
| E15 | Glass[1] (6.5 mm) | ION J (1.5 mm) | Glass[1] (11 mm) | ION J (1.5 mm) | Glass[1] (6.5 mm) | ION J (9 mm) |
| E16 | Glass (4 mm) | ION J (1 mm) | Glass (4 mm) | ION J (3 mm) | Glass (2.5 mm) | PVB (1.52 mm) |
| E17 | Glass (4 mm) | ION J (1 mm) | Glass (4 mm) | ION J (5 mm) | Glass (2.5 mm) | PVB (1.52 mm) |
| E18 | Glass (3 mm) | ION J (4.5 mm) | Glass (2.5 mm) | PVB (0.38 mm) | PET-2 (0.18 mm) | |
| E19 | Glass (3.85 mm) | ION J (2.5 mm) | Glass (2.4 mm) | PVB (0.76 mm) | PET-2 (0.18 mm) | |
| E20 | Glass (3.85 mm) | ION J (3 mm) | Glass (2.4 mm) | PVB (0.76 mm) | PET-2 (0.18 mm) | |
| E21 | Glass (3.85 mm) | ION J (5 mm) | Glass (2.4 mm) | PVB (0.76 mm) | PET-2 (0.18 mm) | |
| E22 | Glass (3.85 mm) | ION J (5 mm) | Glass (2.4 mm) | PVB (1.52 mm) | PET-2 (0.18 mm) | |
| E23 | Glass (6 mm) | ION J (3 mm) | Glass (2.4 mm) | PVB (0.76 mm) | PET-2 (0.18 mm) | |
| E24 | Glass (6 mm) | ION J (5 mm) | Glass (2.4 mm) | PVB (0.76 mm) | PET-2 (0.18 mm) | |
| E25 | Glass (3.85 mm) | ION J (4.5 mm) | Glass (2.4 mm) | PVB (0.38 mm) | PET-2 (0.18 mm) | |
| E26 | Glass (3.3 mm) | ION J (5 mm) | Glass (2.4 mm) | PVB (0.76 mm) | PET-2 (0.18 mm) | |
| E27 | Glass (2.4 mm) | ION J (1 mm) | Glass (2.4 mm) | ION J (3 mm) | Glass (2.4 mm) | PVB (0.76 mm) |
| E28 | Glass (2.4 mm) | ION J (1 mm) | Glass (2.4 mm) | ION J (1 mm) | Glass (2.4 mm) | ION J (2.5 mm) |
| E29 | Glass (6 mm) | ION J (1.5 mm) | Glass (6 mm) | ION J (4.5 mm) | Glass (2.5 mm) | PVB (1.52 mm) |
| E30 | Glass (6 mm) | ION J (1 mm) | Glass (6 mm) | ION J (5 mm) | Glass (2.5 mm) | PVB (1.52 mm) |

| Sample | Layer 7 | Layer 8 | Layer 9 | Layer 10 | Layer 11 |
|---|---|---|---|---|---|
| CE4 | | | | | |
| CE5 | | | | | |
| CE6 | Glass (8 mm) | PU (1.9 mm) | PC (2.5 mm) | | |
| CE7 | PET-1 (0.18 mm) | | | | |
| CE8 | PET-1 (0.18 mm) | | | | |
| CE9 | PET-1 (0.18 mm) | | | | |
| E10 | PET-1 (0.18 mm) | | | | |
| E11 | PET-2 (0.18 mm) | | | | |
| E12 | PET-1 (0.18 mm) | | | | |
| E13 | Glass (6 mm) | ION J (6 mm) | Glass (1.5 mm) | PVB (1.14 mm) | PET-1 (0.18 mm) |
| E14 | Glass (6 mm) | ION J (9 mm) | Glass (1.5 mm) | PVB (1.14 mm) | PET-1 (0.18 mm) |
| E15 | Glass[1] (1.75 mm) | PVB (1.14 mm) | PET-1 (0.18 mm) | | |
| E16 | PET-2 (0.18 mm) | | | | |
| E17 | PET-2 (0.18 mm) | | | | |
| E18 | | | | | |
| E19 | | | | | |
| E20 | | | | | |
| E21 | | | | | |
| E22 | | | | | |
| E23 | | | | | |
| E24 | | | | | |
| E25 | | | | | |
| E26 | | | | | |
| E27 | PET-2 (0.18 mm) | | | | |
| E28 | Glass (2.4 mm) | PVB (1.52 mm) | PET-2 (0.18 mm) | | |
| E29 | PET-2 (0.18 mm) | | | | |
| E30 | PET-2 (0.18 mm) | | | | |

Notes:
[1]Borosilicate glass (all other glass sheets used here are annealed glass sheets).

TABLE 4

| Sample | Total Thickness (mm) | Areal Density (kg/m$^2$) | Ballistics Standard | Bullet Energy (Joule) | Result |
|---|---|---|---|---|---|
| CE4[1] | 20 | 43.3 | EN 1063, Level BR4 | 1510 | Fail |
| E10 | 21.4 | 40.2 | EN 1063, Level BR4 | 1510 | Pass |
| E11 | 22.1 | 42.4 | EN 1063, Level BR4 | 1510 | Pass |
| E29 | 21.6 | 41.8 | EN 1063, Level BR4 | 1510 | Pass |
| E30[2] | 21.4 | 41.5 | EN 1063, Level BR4 | 1510 | Pass (S) |
| CE5[1] | 21.2 | 45.4 | NIJ Level IIIA | 1406 | Pass |
| E12 | 18.3 | 37.6 | NIJ Level IIIA | 1406 | Pass |

TABLE 4-continued

| Sample | Total Thickness (mm) | Areal Density (kg/m²) | Ballistics Standard | Bullet Energy (Joule) | Result |
|---|---|---|---|---|---|
| CE7 | 19.5 | 39.9 | NIJ Level IIIA | 1406 | Pass |
| CE9 | 18 | 37.6 | NIJ Level IIIA | 1406 | Fail |
| CE6 | 39.8 | 89.5 | NIJ Level III | 3406 | Pass |
| E13 | 37.7 | 75.8 | NIJ Level III | 3406 | Pass |
| E14 | 40.8 | 78.8 | NIJ Level III | 3406 | Pass |
| E15 | 37.8 | 66.8 | NIJ Level III | 3406 | Pass |
| CE8 | 18 | 36.4 | NIJ Level IIA | 740 | Fail |
| E16 | 15.8 | 31.3 | NIJ Level II | 921 | Pass |
| E17 | 17.9 | 33.5 | NIJ Level II | 921 | Pass |
| E18 | 10.8 | 19 | NIJ Level I | 342 | Pass |

[1] CE4 and CE5 had the same laminate structure. The difference in thickness and areal density between the two is due to the minor variations in thickness of the glass sheets used in each laminates.
[2] The glass sheets used in the laminates of E30 were primed with a solution of 92% isopropyl alcohol, 7.9% water, 0.01% acetic acid, and 0.09% A-1100 aminosilane prior to the lamination process. Among the three E30 laminates tested under EN 1063, Level BR4, two passed the test with no splinters and one "passed with splinters," i.e., the test bullet did not penetrate the laminate, although glass splintering was observed.

TABLE 5

| Sample | Total Thickness (mm) | Areal Density (kg/m²) | NIJ Level I Testing 38 Spl[1] | 22 LR[2] |
|---|---|---|---|---|
| E19 | 9.6 | 18.8 | Fail | Pass |
| E20 | 10.2 | 19.4 | Fail | Pass |
| E21 | 12.1 | 21.3 | Pass | Pass |
| E22 | 12.8 | 22 | Pass | Pass |
| E23 | 12.2 | 23.2 | Pass | Pass |
| E24 | 14 | 25.7 | Pass | Pass |
| E25 | 11.4 | 20.5 | Pass | Pass |
| E26 | 11.6 | 19.9 | Pass | Pass |
| E27 | 11.7 | 21.6 | Pass | Pass |
| E28 | 14.4 | 27.6 | Pass | Pass |

[1] 38Spl: a 38 Special Round Nose Lead ammunition was used;
[2] 22 LR: a 22 Long Rifle High Velocity Lead ammunition was used.

While certain of the preferred embodiments of the present invention have been described and specifically exemplified above, it is not intended that the invention be limited to such embodiments. It is to be understood, moreover, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A safety glazing comprising an impact zone; and,
adhered firmly to the impact zone, an anti-spall zone;
wherein the anti-spall zone comprises a polymer sheet having a first surface that is adhered firmly to the impact zone and a second surface that is adhered firmly to a polymer film, said polymer sheet comprising a poly(vinyl butyral) composition; and
wherein the impact zone comprises n glass sheets and at least (n−1) ionomer sheets, wherein n is an integer and $3 \leq n \leq 10$, wherein each adjacent pair of glass sheets is interspaced by at least one ionomer sheet, and wherein the glass sheets and the at least one ionomer sheet are adhered firmly by lamination;
wherein each of the at least (n−1) ionomer sheets comprises an ionomer composition, said ionomer composition comprising an ionomer, said ionomer derived from a parent acid copolymer that comprises copolymerized units of an α-olefin having from 2 to 10 carbon atoms and, based on the total weight of the parent acid copolymer, from about 20 to about 30 wt % of copolymerized units of an α,β-ethylenically unsaturated carboxylic acid having 3 to 8 carbon atoms;
wherein about 20 mole % to about 50 mole %, based on the total number of moles of copolymerized units of α,β-ethylenically unsaturated carboxylic acid in the parent acid copolymer, of the carboxylic acid groups of the ionomer are neutralized to form carboxylate groups;
wherein the ionomer further comprises cations as counterions to the carboxylate groups; and
wherein the ionomer composition in each of the ionomer sheets may be the same or different; and
further wherein each ionomer sheet has a thickness; the ionomer sheet that is closest to the anti-spall zone has a thickness of about 2 to about 20 mm; the ionomer sheet that is furthest from the anti-spall zone has a thickness of about 1 to about 10 mm; the ionomer sheet that is closest to the anti-spall zone has the greatest thickness; and the ionomer sheet that is furthest from the anti-spall zone has the smallest thickness.

2. The safety glazing of claim 1, wherein the parent acid copolymer comprises about 20 to about 25 wt % of the copolymerized units of the α,β-ethylenically unsaturated carboxylic acid.

3. The safety glazing of claim 1, wherein the parent acid copolymer has a melt index (MI) of about 60 g/10 min or less, as determined in accordance with ASTM D1238 at 190° C. and 2.16 kg.

4. The safety glazing of claim 1, wherein about 20 mole % to about 35 mole % of the carboxylic acid groups of the ionomer are neutralized.

5. The safety glazing of claim 1, wherein the ionomer has a MI of about 10 g/10 min or less, as determined in accordance with ASTM method D1238 at 190° C. and 2.16 kg.

6. The safety glazing of claim 1, wherein the ionomer has a flexural modulus greater than about 40,000 psi, as determined in accordance with ASTM method D790 (Procedure A).

7. The safety glazing of claim 1, wherein the cation is selected from the group consisting of sodium, lithium, magnesium, zinc, and potassium ions.

8. The safety glazing of claim 1, wherein the ionomer has (i) a MI of about 5 g/10 min or less; (ii) a flexural modulus greater than about 50,000 psi; (iii) about 20 mole % to about 50 mole % of carboxylate groups, based on the total number of moles of the copolymerized units of the α,β-ethylenically unsaturated carboxylic acid; (iv) comprises cations of one or more metals selected from the group consisting of sodium, lithium, magnesium, zinc, and potassium;

and (v) the parent acid copolymer from which the ionomer is derived has (a) a MI of about 45 g/10 min or less and (b) comprises about 21 to about 23 wt % of the copolymerized units of the α,β-ethylenically unsaturated carboxylic acid.

9. The safety glazing of claim 8, wherein the ionomer comprises sodium cations.

10. The safety glazing of claim 1, wherein the polymer sheet has a thickness of about 10 to about 100 mil (about 0.25 to about 2.54 mm).

11. The safety glazing of claim 1, wherein the polymer film comprises a polymer material selected from the group consisting of poly(ethylene terephthalate), polycarbonate, polypropylene, polyethylene, cyclic polyolefin, norbornene polymer, polystyrene, styrene-acrylate copolymers, acrylonitrile-styrene copolymers, poly(ethylene naphthalate), polyethersulfone, polysulfone, polyamide, poly(urethane), acrylic, cellulose acetate, cellulose triacetate, cellophane, poly (vinyl chloride), polyvinylidene chloride, vinylidene chloride copolymers, fluoropolymer, polyvinyl fluoride, polyvinylidene fluoride, polytetrafluoroethylene, and ethylene-tetrafluoroethylene copolymers.

12. The safety glazing of claim 11, wherein the polymer film is a bi-axially oriented poly(ethylene terephthalate) film.

13. The safety glazing of claim 12, wherein the bi-axially oriented PET film has (i) a tensile modulus of about 600,000 psi (4.14 GPa) or higher at both machine direction and transverse direction, (ii) a shock brittleness index of about 55 Joule or higher at MD and about 25 joule or higher in the transverse direction, and (iii) a percent elongation at break of about 110 to about 160 in the machine direction and about 60 to about 110 in the transverse direction.

14. The safety glazing of claim 12, wherein the polymer film has a thickness of about 3 to about 10 mil (about 0.076 to about 0.26 mm).

15. The safety glazing of claim 12, wherein at least one surface of the polymer film is coated with a transparent abrasion resistant hardcoat.

16. The safety glazing of claim 15, wherein an outermost surface of the polymer film, which is opposite from the impact force, is coated with the hardcoat selected from the group consisting of oligomeric-based coatings and polysiloxane abrasion resistant coatings.

17. The safety glazing of claim 12, wherein at least one surface of the polymer film has undergone an adhesion enhancing treatment.

18. The safety glazing of claim 17, wherein an innermost surface of the polymer film, which is adjacent to the polymer sheet, has undergone an adhesion enhancing treatment selected from the group consisting of energy treatments and application of primers or adhesives.

19. The safety glazing of claim 1, wherein (i) each of the glass sheets independently has a thickness of about 1 to about 16 mm; (ii) at least one of the ionomer sheets has a thickness of about 2 to about 20 mm; and (iii) each of the other ionomer sheets independently has a thickness of about 1 to about 10 mm.

20. The safety glazing of claim 1, consisting essentially of an impact zone and an anti-spall zone, said impact zone consisting essentially of a first glass sheet having a surface that is contiguous with a first surface of a first ionomer sheet; a second glass sheet having a first surface that is contiguous with a second surface of said first ionomer sheet; a second ionomer sheet having a first surface that is contiguous with a second surface of said second glass sheet; and a third glass sheet having a first surface that is contiguous with a second surface of said second ionomer sheet; and said anti-spall zone consisting essentially of a PVB sheet having a first surface that is contiguous with a second surface of said third glass sheet; and a bi-axially oriented PET film having a first surface that is contiguous with a second surface of said PVB sheet.

21. The safety glazing of claim 1, consisting essentially of an impact zone and an anti-spall zone, said impact zone consisting essentially of a first glass sheet having a surface that is contiguous with a first surface of a first ionomer sheet; a second glass sheet having a first surface that is contiguous with a second surface of said first ionomer sheet; a second ionomer sheet having a first surface that is contiguous with a second surface of said second glass sheet; a third glass sheet having a first surface that is contiguous with a second surface of said second ionomer sheet; a third ionomer sheet having a first surface that is contiguous with a second surface of said third glass sheet; and a fourth glass sheet having a first surface that is contiguous with a second surface of said third ionomer sheet; and said anti-spall zone consisting essentially of a PVB sheet having a first surface that is contiguous with a second surface of said fourth glass sheet; and a bi-axially oriented PET film having a first surface that is contiguous with a second surface of said PVB sheet.

22. The safety glazing of claim 1, consisting essentially of an impact zone and an anti-spall zone, said impact zone consisting essentially of a first glass sheet having a surface that is contiguous with a first surface of a first ionomer sheet; a second glass sheet having a first surface that is contiguous with a second surface of said first ionomer sheet; a second ionomer sheet having a first surface that is contiguous with a second surface of said second glass sheet; a third glass sheet having a first surface that is contiguous with a second surface of said second ionomer sheet; a third ionomer sheet having a first surface that is contiguous with a second surface of said third glass sheet; a fourth glass sheet having a first surface that is contiguous with a second surface of said third ionomer sheet; a fourth ionomer sheet having a first surface that is contiguous with a second surface of said fourth glass sheet; and a fifth glass sheet having a first surface that is contiguous with a second surface of said fourth ionomer sheet; and said anti-spall zone consisting essentially of a PVB sheet having a first surface that is contiguous with a second surface of said fifth glass sheet; and a bi-axially oriented PET film having a first surface that is contiguous with a second surface of said PVB sheet.

23. An article comprising the safety glazing of claim 1.

24. The article of claim 23, wherein the article is selected from the group consisting of civilian cars, military vehicles, cash trucks, armored cars, buildings, high speed trains, aircraft, construction equipment, and farm equipment.

* * * * *